May 5, 1931.  J. S. CHURCH  1,804,148
CABLE TRACTOR
Filed March 30, 1925   2 Sheets-Sheet 1
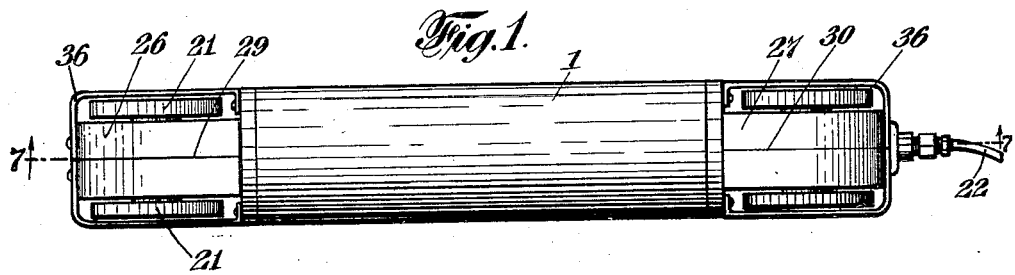
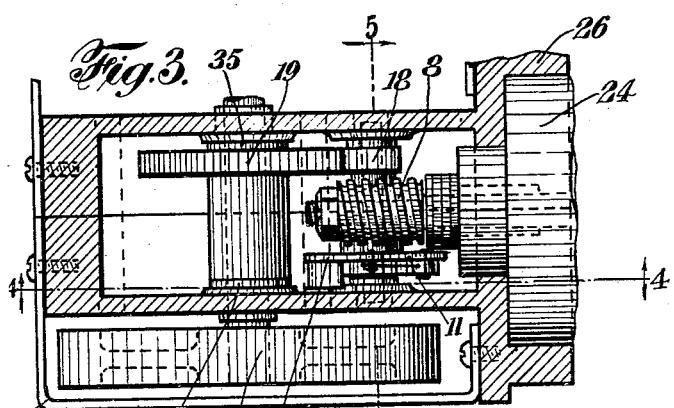
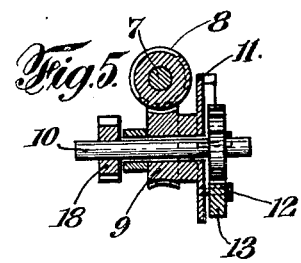
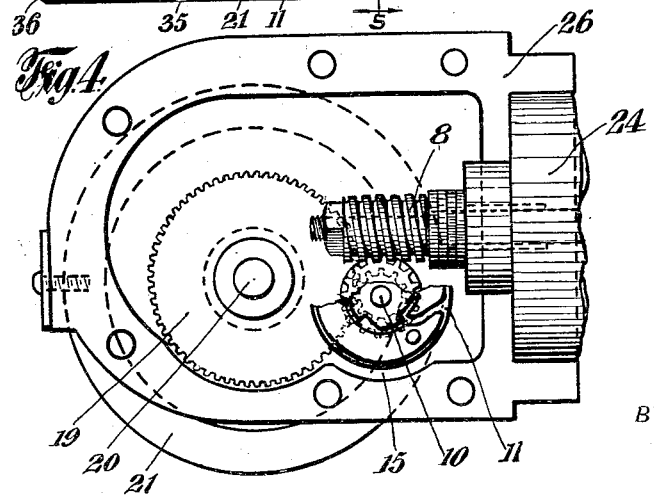
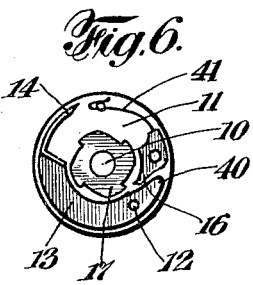
INVENTOR
James S. Church
BY
Kenyon & Kenyon
ATTORNEYS May 5, 1931. J. S. CHURCH 1,804,148
CABLE TRACTOR
Filed March 30, 1925 2 Sheets-Sheet 2
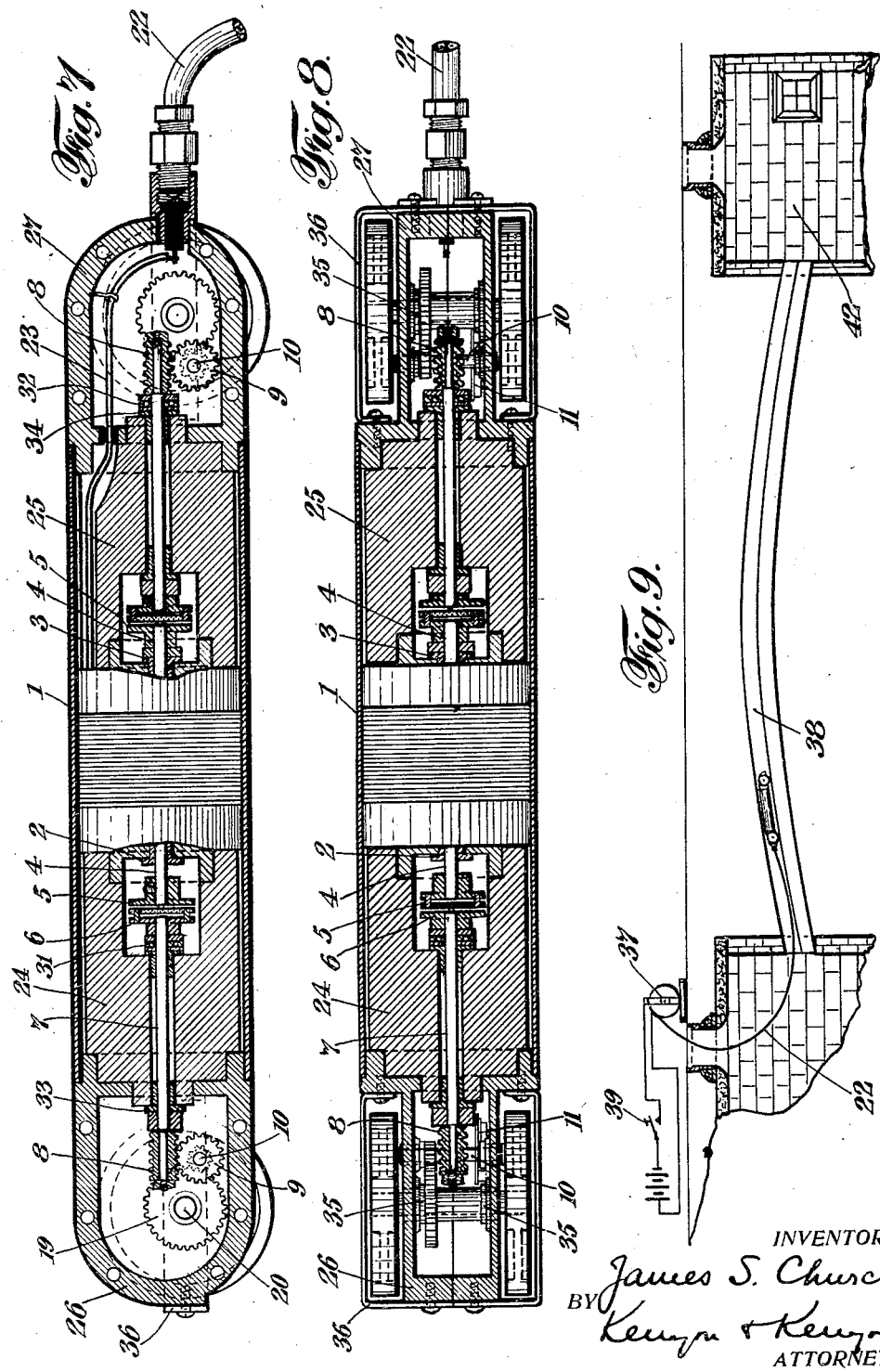
INVENTOR
James S. Church
BY Kenyon & Kenyon
ATTORNEYS Patented May 5, 1931

1,804,148

UNITED STATES PATENT OFFICE

JAMES S. CHURCH, OF BROOKLINE, MASSACHUSETTS

CABLE TRACTOR

Application filed March 30, 1925. Serial No. 19,546.

My invention relates to improvements in cable tractors.

Its object is to provide a means for carrying the end of a cable through a section of conduit such as may be laid under ground or in a building. This object is attained by providing a vehicle of such size and shape that it can pass through the conduits overcoming obstacles met therein. The tractor is driven by an electric motor suitably geared to four drive wheels, and carries with it a cable which supplies power to the motor and serves as a means subsequently for drawing through the permanent cable which it is desired to lodge in the conduit.

The method of threading cables through underground conduits heretofore employed, has been to insert short sections of wooden or metal rod into the end of the conduit. Each rod has a suitable hooking device at the end thereof whereby it may be held in abutment with the end of the succeeding rod. A long chain of rods is thus pushed through the conduit by hand. Due to the buckling of this chain of rods within the conduit, with the resulting friction on alternate sides thereof, it has been found that, especially in long reaches of conduit where manholes may be as much as five hundred feet apart, the strength of two or more men is necessary to force the chain through. The object of my present invention is to obviate the need of so much man power, and to provide a simple automatic means for threading a cable quickly and reliably through the conduit duct.

It is one of the advantages of my invention that the complete equipment, including the tractor, the cable by which its motor is fed, and the reel from which the cable is supplied, can conveniently be transported in relatively small compass on the conventional repairman's wagon or truck. Another advantage of my invention is that cables can be carried through conduits in a small fraction of the time heretofore regarded as necessary.

In the drawings which form a part of this specification, Fig. 1 represents a plan view of my improved cable tractor; Fig. 2 represents a side elevation of the same; Fig. 7 represents a longitudinal vertical section (details of the motor not being shown) on the line 7—7 of Fig. 1; and Fig. 8 represents a horizontal longitudinal section (details of the motor not being shown) on the line 8—8 of Fig. 2. Fig. 3 is a detail of the left end of Fig. 8 on an enlarged scale, one wheel being removed. Fig. 4 is a vertical longitudinal section on the line 4—4 of Fig. 3. Fig. 5 is a vertical transverse section on the line 5—5 of Fig. 3, showing only the worm drive and clutch mechanism. Fig. 6 is an elevation of the clutch mechanism. Fig. 9 is a diagrammatic representation of the method of use of my improved tractor in drawing a cable through a street underground conduit. In all of the figures shown like reference numbers indicate like parts.

1 represents a central shell or body member of my tractor. Within this casing or shell, and centrally disposed therein I place a universal-wound motor, suitable for use with alternating or direct current of any voltage up to 110. The motor, not forming a part of my invention, I have not shown in my drawings in any more detail than to indicate at 2 and 3 the bushings at each end thereof, and thus to indicate the points between which a suitable motor may be placed, adapted to rotate the rotor shaft 4. On each end of this rotor shaft I apply rigidly a drive disc 5. Describing now merely the front half of my tractor, shown at the left end of Figs. 7 and 8, I attach this drive disc 5 to a second drive disc 6 by means of any flexible coupling of ordinary form. The drive disc 6 is rigidly affixed to the main drive shaft 7 which in turn rotates the worm 8. The worm 8 is arranged to engage the worm gear 9. The worm gear 9 is disposed upon, but free to slide upon, the cross shaft 10 as best shown in Fig. 5. Integral with the worm gear 9 and likewise free to rotate upon the shaft 10, is the disc 11. This disc carries upon its face, and attached thereto by the pin 12 a counterweight 13 provided with a scoop or bucket 14 adapted to swing radially outward from the center of the disc 11 by centrifugal force, and when so swung outwardly to throw oil from the reservoir 15 over the train of gears hereinafter described.

A further function of the scoop 14 is to swing the counterweight 13 upon its pivot 12 in such manner that the pawl 16 is pressed into engagement with the ratchet 17. The ratchet 17 is rigidly affixed to the shaft 10. Rigidly attached to the shaft 10, at the opposite end thereof, is a small pinion gear 18 disposed in mesh with the main drive gear 19. The main drive gear 19 is rigidly affixed to the main axle 20 which in turn drives the forward pair of wheels 21 of the tractor.

A like train of gears, including a ratchet, is adapted to operate the drive wheels at the rear end of the tractor, and in view of the identity of structure will not be set forth here in detail.

Power is supplied to the motor from the lead-in cable 22 through a marine plug adapted to utilize the metal frame of the tractor as one conductor, and an insulated wire 23 as the other conductor.

In order to provide weight, and thus secure adequate tractive effort within the conduit, I provide unusually heavy drive shaft housings 24 and 25. These are held in place by gear case frames 26 and 27. The completed gear case at each end of the tractor is formed by the side plates 28, the top and bottom of the gear chamber being formed by abutting edges of the gear case frames 26, 27 meeting on the line 29, 30. The frames 26, 27 are inserted in the ends of the tubular member 1 and, being held in place by a push-fit joint or a set screw, hold together the shaft housings 24, 25 and the motor in the center of the tractor.

To take care of the lengthwise thrust of the main drive shaft 7 I provide at 31 and 32 suitable thrust bearings. At 33 and 34 I provide oil-tight bearings to prevent leakage of oil from the main gear chambers at each end of the machine and similar oil-tight bearings are provided at 35 to prevent escape of oil from the machine. A guard 36 is attached to each end of my tractor to prevent fouling of the wheels while the machine is in transit through a conduit. It is intended that the train of gears enclosed within the gear housing at each end of my tractor shall continuously run in oil. All joints are therefore sealed, for the double purpose of preventing the escape of oil and protecting the machinery of my tractor from the mud, slime or water which may be encountered in the conduit duct.

The feed cable 22 is fed to the tractor from a suitable reel 37. The details of construction of this reel I do not here set forth, as such reels have heretofore been known. Electric current is supplied to the reel, preferably each side of the current flowing through one of the two bearing pins of the reel, and is thus communicated to the cable attached to the reel. Current may thus be supplied through the cable 22 to the tractor as it passes along the duct 38 as shown diagrammatically in Fig. 9.

The mode of operation of my improved tractor is as follows. The tractor is inserted by hand into the end of the duct 38. Upon the closing of the switch 39 current is supplied through the cable 22 to the motor. The motor is adapted to rotate the shaft 7 in a counter-clockwise direction as it is seen in Fig. 5. The revolution of the shaft 7, and with it the worm 8, serves to turn the worm gear 9 and with it the disc 11 in a clockwise direction as seen in Fig. 4. The clockwise rotation of the disc 11 causes the counterweight 13 to swing outwardly from the center of the disc 11 by reason of the centrifugal force set up. The outward motion of the counterweight 13 is further accentuated by the catching of the scoop 14 in the oil which has accumulated in the reservoir or sump 15. The outward movement of the counterweight 13 causes its tail end 40 to depress the pawl 16 against the force of the spring 41, and to cause it to come into engagement with one of the shoulders of the ratchet 17. Driving connection thus being perfected between the clutch disc 11 and the shaft 10, power is transmitted from the shaft 10 through the gears 18 and 19 and the main axle 20 to the drive wheels 21. As long as current is supplied to the motor, this driving connection will be maintained due to the continuance of centrifugal forces upon the counterweight 13. When, however, the current is cut off by opening the switch 39, the cessation of motion in the disc 11 causes the force of spring 41 to predominate and to move the pawl 16 out of engagement with the ratchet 17. Upon this disengagement being effected, mechanical driving connection between the motor and the driving wheels 21 is severed, and the tractor is thereupon free to roll without hindrance from the motor.

The purpose of the ratchet and pawl device is to enable the tractor conveniently to be withdrawn from a conduit should the source of power for any reason be cut off.

When the tractor has entirely traversed the conduit and has come into the hands of an operator in the manhole 41, the tractor is disengaged from its power cable 22 and the latter is then used as the preliminary means for pulling through the permanent cable which it is desired to lodge in the conduit 38. In view of this secondary use of the power cable 22, I prefer to use a cable suitably sheathed and constructed to withstand not only the friction and moisture encountered but also possessed of sufficient tensile strength to permit its being used for the purpose above set forth.

I have limited my description, both as regards construction and mode of operation, to the front end of my tractor, for the reason that the driving mechanism and train of gears in the front and rear ends of my tractor are identical except for the device at the tail end of my tractor for attaching the feed cable and leading in the power current.

While I have set forth in this specification the preferred form of my invention, as embodied more particularly in a four wheel drive tractor, I do not desire to be limited to the precise form of mechanism shown. It is, for example, equally practicable to build my tractor with any even number of drive wheels. Nor is the ratchet clutch an essential element of my invention, inasmuch as it is placed in the train of gears merely to allow the wheels to slide freely when the motor is shut off. Any means other than the particular one disclosed may be used for attaining this end.

Having thus described my invention, what I claim as new and desire to secure by Letters Patent of the United States is:—

1. A conduit tractor comprising a liquid-tight casing, axles extending through said casing at the ends thereof, wheels on said axles, a motor positioned between said axles, worm gear drives for said axles operatively connected to said motor through pawl-and-clutch mechanisms, and means carried by said mechanisms for throwing oil in said casing upon said gears.

2. A conduit tractor adapted to be operated by electric power comprising a centrally disposed power shaft, a worm gear at each end thereof and ratchet and pawl clutches actuated by each of said worm gears enclosed within a sealed casing adapted to bring said power shaft into operative relation with traction members external to said casing when the power shaft is rotated.

3. A conduit tractor adapted to be operated by electric power comprising a centrally disposed power shaft, a worm gear at each end thereof and ratchet and pawl clutches actuated by each of said worm gears enclosed within a sealed casing adapted to bring said power shaft into operative relation with traction members external to said casing when the power shaft is rotated, said clutches being provided with means for throwing oil over the gears within said casing.

4. A conduit tractor adapted to be operated by electric power comprising a centrally disposed power shaft, a worm gear at each end thereof and ratchet and pawl clutches actuated by each of said worm gears enclosed within a sealed casing adapted to bring said power shaft into operative relation with traction members external to said casing when the power shaft is rotated, said clutches being provided with means for throwing oil over the gears within said casing, and weight members forming a part of said casing for enhancing the tractive effort of said tractor.

5. A conduit tractor comprising an electric motor, a drive shaft composed of elongations of each end of the rotor of said motor, said drive shaft being centrally disposed and provided with worm gears at each end thereof, ratchet and pawl clutches actuated by each of said worm gears upon rotation of said drive shaft to bring said drive shaft into operative relation with traction members, external to said casing, said motor, gears and clutches being enclosed in a sealed chamber.

In testimony whereof, I have signed my name to this specification.

JAMES S. CHURCH.